United States Patent [19]

Boggio

[11] Patent Number: 5,404,343
[45] Date of Patent: Apr. 4, 1995

[54] RESTING PLACE MARKER WITH AUDIO SYSTEM

[76] Inventor: Bruce M. Boggio, 390 Rio Lindo Ave. #17, Chico, Calif. 95926

[21] Appl. No.: 956,265

[22] Filed: Oct. 5, 1992

[51] Int. Cl.[6] .............................................. G11B 15/68
[52] U.S. Cl. ...................................... 369/19; 369/69; 360/12; 40/455
[58] Field of Search .................. 369/19, 69, 15, 14, 369/20; 360/1, 12; 40/455; 365/45

[56] References Cited

U.S. PATENT DOCUMENTS

| | | | |
|---|---|---|---|
| 3,928,928 | 12/1975 | Kalust | 40/455 |
| 4,023,151 | 5/1977 | Markham | 369/19 |
| 4,169,970 | 10/1979 | Opiela et al. | 369/19 |
| 4,318,188 | 3/1982 | Hoffmann | 365/45 |
| 4,670,798 | 6/1987 | Campbell et al. | 369/19 |
| 4,881,205 | 11/1989 | Aihara | 365/45 |
| 5,164,915 | 11/1992 | Blyth | 365/45 |

*Primary Examiner*—Robert J. Pascal
*Assistant Examiner*—Tan Dinh

[57] ABSTRACT

A marker such as a grave stone or tombstone for visually identifying the resting place of the remains of a once living entity, with the marker preferably having a location for written information to be applied thereto for specifically identifying the remains. The marker includes an audio system which can audibly broadcast information relevant to or regarding the identified remains. The audible broadcast may be an epitaph, music, poems, favorite sayings, stories, voice messages to the world or loved ones, combinations thereof, and or anything which can be broadcast by an audio speaker in audible tones or voice(s). The audio system includes capabilities for electronically retrieving the information for audible broadcast from digital information stored within semiconductor electronics, and thereby electrical power consumption is kept low, as is the number of moving parts in the audio system. An electrical power supply, preferably including a photovoltaic panel, is used for electrically powering the audio system.

1 Claim, 6 Drawing Sheets

RESTING PLACE MARKER WITH AUDIO SYSTEM

BACKGROUND OF THE INVENTION

1. Field of the Invention

This invention is a grave marker or the like having an audio system for audibly broadcasting at the burial or resting site of the remains of a human or animal.

2. Description of the Prior Art

Although there have been grave markers or tombstones which included audio playback capacities in the past, all seem to have design or structural shortcomings which have for the most part rendered them impractical. For example, U.S. Pat. No. 3,928,928 issued Dec. 30, 1975 to P. M. Kalust for AUDIO VISUAL MEMORIAL, required an electrical outlet at the grave site, which cemeteries would have to install and maintain at a large expense. Additionally, the Kalust device uses magnetic tape as a form of recording information for playback. Magnetic tape, which is known to be fragile, does not stand up well to temperature extremes over the long term, often stretching or breaking in high heat, and becoming brittle and often breaking in cold weather or with age. U.S. Pat. No. 4,169,970 issued Oct. 2, 1979 to M. L. Opiela for MEMORIAL AUDIO REPRODUCTION SYSTEM, like that of Kalust, also uses magnetic tape for the storage of information, and therefore would have similar shortcomings. The Opiela system proposes using a solar cell to supplement batteries which power the tape player. The amount of electrical power required to drive a mechanical tape player or a similar device such as a record or laser disk player is normally quite high, which may result in the batteries being depleted excessively quickly. It is these among other shortcomings which my invention overcomes.

SUMMARY

The present invention is an improved grave or resting place marker and audio system combination. The marker may take the form of any suitable permanent marker for visually identifying the resting place of the remains of a once living entity, person or animal. The marker preferably includes a location for written information to be applied thereto for display, for specifically identifying the remains, usually by name and living years as is conventional with modern resting site markers. The marker, for further example, may be similar in shape to a conventional tombstone having a stabilizing base with a vertically rising portion thereon, or may be what is becoming more popular, the generally flat plate style marker which sets generally flush with the ground surface and allows for easy lawn mowing over and around the marker. My marker with attached audio system may also be fashioned as the door or an attached component of the door of a mausoleum.

My marker in accordance with the present invention further includes the attached audio system which can audibly broadcast information regarding or relevant to the human or animal remains which the marker is placed adjacent. The information of the broadcast may be an epitaph, music, poems, favorite sayings, stories, voice messages to the world or loved ones, combinations thereof, and or anything which can be digitally stored in a semiconductor as retrievable information and broadcast by an audio speaker in audible tones or voice(s).

My audio system is believed to be a substantial improvement over the prior art grave-marker audio system combinations because of its durability, having few if any moving parts, and its very low electrical consumption. My audio system includes capabilities for retrieving the information for audible broadcast from previously stored binary or digital information stored within and retrieved from solid state or semi-conductor electronics for the audible broadcast. Nonvolatile digital information storage such as in nonvolatile RAM (random access memory), as opposed to volatile information storage, is preferred so the information is not lost with an electrical power loss, however volatile digital information storage would also function, but would have the disadvantage of information loss with electrical power loss. By using nonvolatile digital information storage within semi-conductors in my audio system, the relatively high maintenance required of the moving parts associated with the spinning of fragile magnetic or digital tapes, or analog or digital disks is eliminated. Additionally, using nonvolatile digital information storage greatly reduces the necessary electrical power required to retrieve and audibly broadcast information when compared to the relatively large amount of electrical power consumed with the rotating of magnetic or digital tapes, or the spinning of analog or digital disks and the like, and therefore the present audio system as part of the present invention is seen to be a significant advancement in the art.

The audio system in accordance with the present invention preferably utilizes an electrical power supply completely located at the marker site, and which does not require the cemetery operators to supply expensive underground or overhead wiring of power company supplied power to the resting place. The electrical power supply of and for the audio system may include a battery and a photovoltaic panel (solar panel) connected to charge the battery. However, as time passes, and photovoltaic cells are developed which are more efficient than today's, or if a relatively large solar panel can be installed due to sufficient available space, then I anticipate the possible elimination of the battery. In this situation, nonvolatile digital information storage would be used, and the solar panel would supply all of the power to operate the audio system, and thus problems associated with batteries would be eliminated, although the audio system would not be operable in the dark. A possibly feasible alternative power source might be a battery alone, without the use of a photovoltaic panel, and with this arrangement, the users might bring their own battery to plug into the audio system, and thereby be assured of a fresh battery. A manually actuatable switch is preferably connected to the audio system for beginning the audible broadcasting by anyone whom wishes to hear the information, however the mere insertion of a battery may be the means of starting the audio broadcasting. The start switch or button which is preferred, could be of many known types, such as a water proof push button or possibly a galvanic switch which requires a human touch to trigger.

The technology and components for manufacturing the type of audio system with digital memory used in my invention is presently known and in use for other items such as personal computers where RAM and ROM (read only memory) are used, in electronic musical instruments, greeting cards of the type which play music, state-of-the-art telephone answering machines, and audible warnings particularly in automobiles which utilize digitally recorded voices, to name just a few current uses. Nonvolatile digital memory in solid-state or semi-conductor chips, commonly referred to flash memory RAM chips, are readily available from such companies as Intel Corporation of Santa Clara, Calif., U.S.A. or Nippon Electronic Corp. (NEC) of Japan to name just a couple. Consequently, the individual components and detailed information for the building and using of an audio system which my invention uses is readily available. A single integrated circuit chip can and will be designed and built specifically for my audio system, however, there are many ways in which to effectively design and build the required electronic circuits using available discrete components and available memory chips and integrated circuit chips in combination.

With the present invention, the programing of the digital information into storage in semi-conductor memory for later retrieval and audible broadcast will most likely be done in a factory setting wherein an audio recording sent by the end purchaser may be digitized and stored in the solid state circuits of my audio system, or preselected music or poems or anything desired may be installed in digital memory before the audio system or memory chips for the audio system are delivered to the purchaser.

BEST MODE FOR CARRYING OUT THE INVENTION

Figure 1:
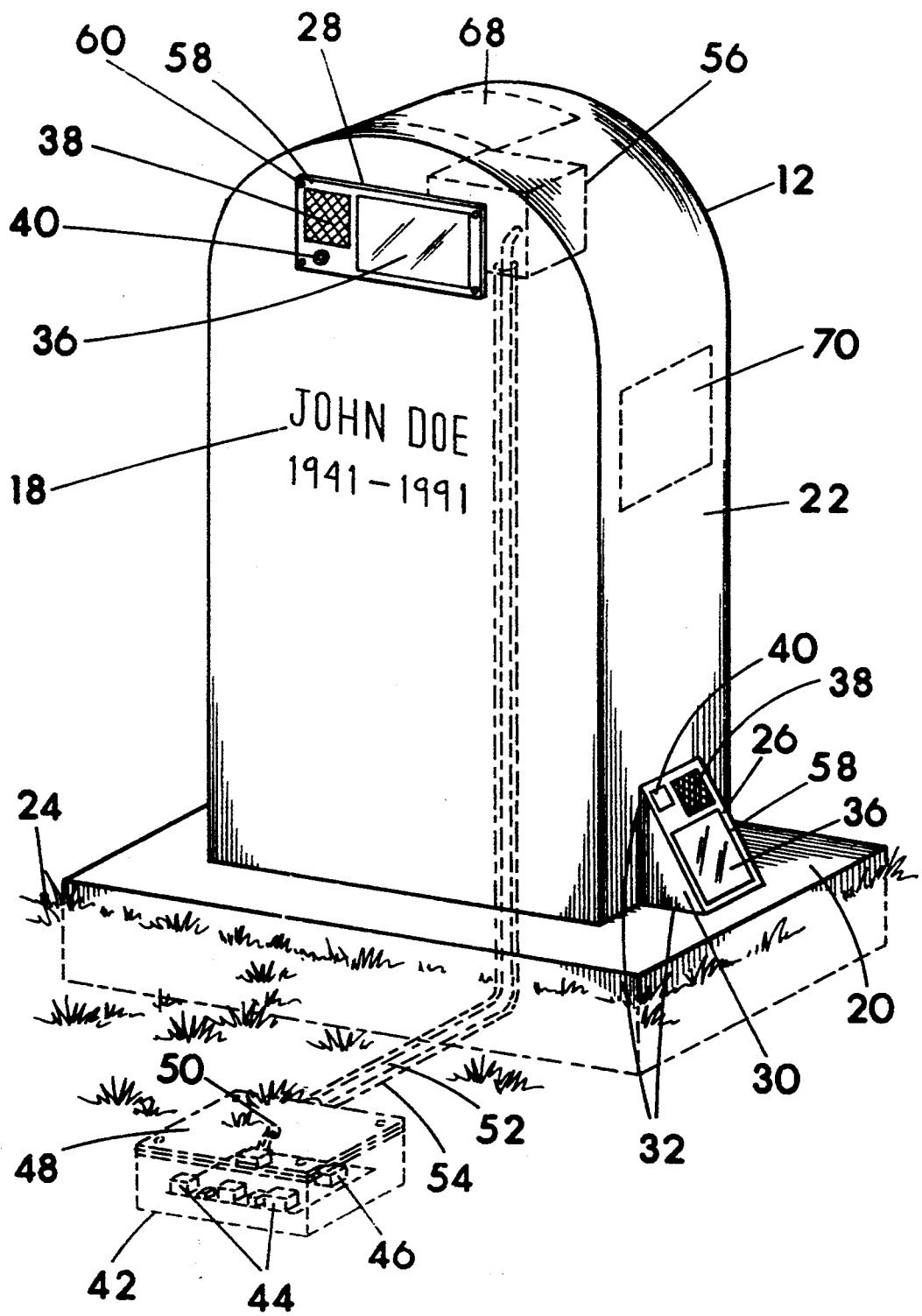
FIG. 1 is a view of a tombstone showing two audio system housing embodiments to demonstrate two of the several ways and locations to house and attach the audio system. Normally only one audio system would be used on a single resting site marker.

As previously stated, the present invention is a grave or resting place marker and audio system combination. The marker may take the form of a generally flat grave plate or stone as shown in drawing FIG. 3 and designated 10; tombstone 12 as shown in FIGS. 1, 2, 5, and 6; or mausoleum door 16 or component thereof as shown in FIG. 4 on a mausoleum 14 Each of the grave or resting place markers preferably includes a space or location 18 for written information to be applied by printing, engraving or surface attachment and the like for display at 18, for specifically identifying the remains, usually by name and living years generally as shown and as is conventional with modern burial site markers. The resting place marker may be fashioned in the form of any suitable marker for humans or animals. The markers may be made of any suitably durable materials such as stone, metal, concrete, plastics, combinations thereof, or any materials which will stand the test of time particularly in outdoor weather. For further example the markers may be similar in shape to a conventional tombstone 12 having a stabilizing base 20 with a vertically rising portion 22 thereon, or may be the generally flat plate style marker 10 which sets generally flush with the ground surface 24 and allows for easy lawn mowing over and around the marker. The markers may includes bores and recesses as needed to accommodate the building in or surface attachment of the audio system.

The resting place marker(s) further includes the attached audio system which can audibly broadcast information regarding or relevant to the human or animal remains which the marker is placed adjacent to visually identify. The information of the broadcast may be an epitaph, music, poems, favorite sayings, stories, voice messages to the world or loved ones, combinations thereof, and or anything which can be stored as retrievable information and broadcast by an audio speaker in audible tones or voice(s). The audio system, being a digit system in its information storage and retrieval, is essentially the same in all of my resting place markers, however the audio system housing and attachment location relative to the marker may vary depending on a number factors. The audio system includes an electrical power supply located at the marker site. The electrical power supply of and for the audio system may include a battery 46 connected to the digital electronics and memory circuits 44, and the support circuitry such as an audio amplifier, and a photovoltaic panel (solar panel) 36 connected to charge the battery 46. The audio system also includes a manually operable start switch 40 connected to the digital electronics and memory circuits 44 and utilized to initiate the audible broadcasting. The start switch 40 may include an off mode to stop the broadcast when desired. As options, a manual volume control and circuit, and an earphone jack may also be included as a part of the audio system. My audio system is believed to be a substantial improvement over the prior art grave-marker audio system combinations for a number of reasons including it has no or very few moving parts. Additionally my audio system includes capabilities for retrieving the information for audible broadcast from stored digital information stored within and retrieved from solid state or semi-conductor electronics for the audible broadcast. Nonvolatile digital information storage, as opposed to volatile information storage, is preferred so the information is not lost with an electrical power loss.

FIG. 1 is a view of a tombstone 12 showing two audio system housing embodiments at 26 and 28 to demonstrate two of the several ways and locations to house and attach the audio system. Normally only one audio system would be used on a single marker. The first audio system embodiment 26 includes a surface mountable wedge shaped housing 30 attached in the corner between the vertical portion 22 and the base 20 of the tombstone 12. The wedge shaped housing 30 may be attached with mechanical fasteners such as expansion anchors and screws or the like, but in this case is attached with an epoxy glue at 32. As shown, the angled front face plate 58 of the housing includes a solar panel 36, a water proof audio speaker 38, and a start button or switch 40 to start the audio broadcast. The angled front face plate 58 of housing 30 positions solar panel 36 at an improved angle relative to being vertical for collecting sun light. Audio system embodiment 26 may be placed on any of the four sides of the tombstone 12 determined to be best for collecting sun light and convenient of use. Other shapes of surface mountable digital audio systems, such as rectangular, could of course be used.

Figure 2:
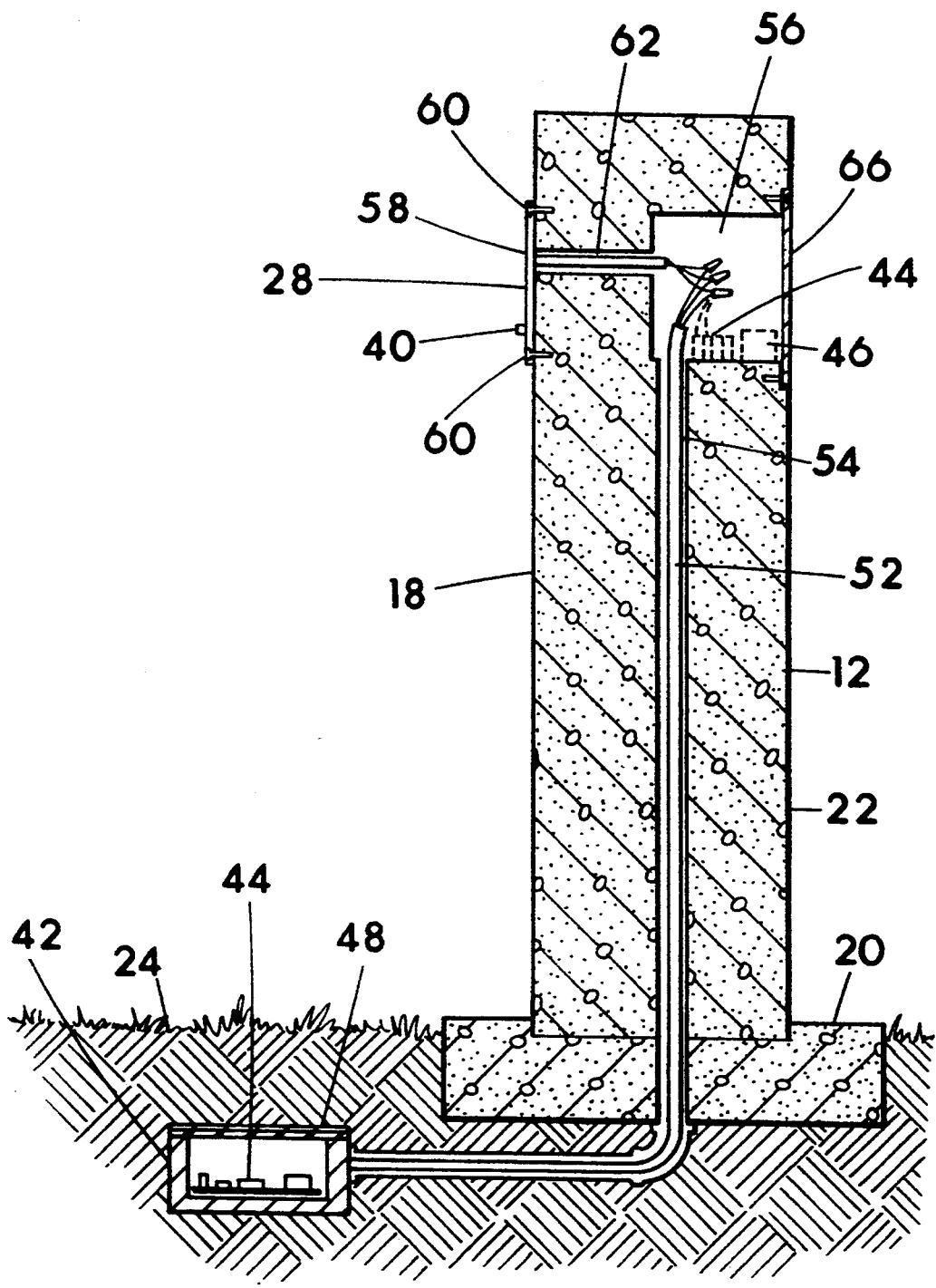
FIG. 2 is a partial cross-sectional view of a tombstone with audio system in accordance with the present invention.

In FIG. 1, the second audio system embodiment 28 is illustrated as essentially two sections remote of one another and connected with electrical wiring. It is anticipated there may be some geographical regions where the ambient temperature may reach excessively high or low temperatures for proper operation of some of the digital electronics and memory circuits 44 and possibly battery 46, and therefor in the example in FIG. 1, the possibly temperature sensitive components are encased in a water proof housing 42 positioned underground. It is believed the ground will somewhat moderate the excessive temperatures. The components which could be in the underground water proof housing 42 include the digital electronics and memory circuits 44 and the battery 46 or batteries. Water proof housing 42 should have a gasketed water proof access cover 48 and at least one conduit entrance 50 for the ingress and egress of electrical conductors 52. Connected to the conduit entrance 50 of housing 42 is a conduit 54 containing electrical conductors 52. Conduit 54 is shown extending horizontally from housing 42 then rising vertically through base 20 and vertical portion 22 of tombstone 12. Conduit 54 and conductors 52 are shown entering a junction box 56 in tombstone 12. An exposed face plate 58 of the audio system is shown attached to the front surface of the tombstone 12. The face plate 58 is attached by mechanical fasteners to tombstone 12 at 60. The face plate retains or at least surrounds the solar panel 36, the water proof speaker 38, and the start switch 40. Electrical conductors 62 attached to the backside of the solar panel 36, speaker 38, and start switch 40 extend through a small bore 64 shown in FIG. 2 and enter junction box 56. Junction box 56 includes a removable water tight cover 66 shown in FIG. 2 which allows for the splicing of the conductors therein. Junction box 56 could contain all of the electronics 44 and battery 46, eliminating the need for water proof box 42 underground in areas where temperature is not a problem as is illustrated in FIG. 2 in dotted line in junction box 56. The cover 66 of junction box 56 could retain a solar panel, and in dotted outline in FIG. 1, two alternative places of solar panels are shown at 68 and 70. The conductors from these alternative solar panel locations would also enter junction box 56 through wire conduits or bores. Battery 46 could be located in junction box 56 for easier replacement, and this would allow the pouring full of water proof box 42 with epoxy for further water proofing of the digital electronics and memory circuits 44 if desired.

Figure 3:
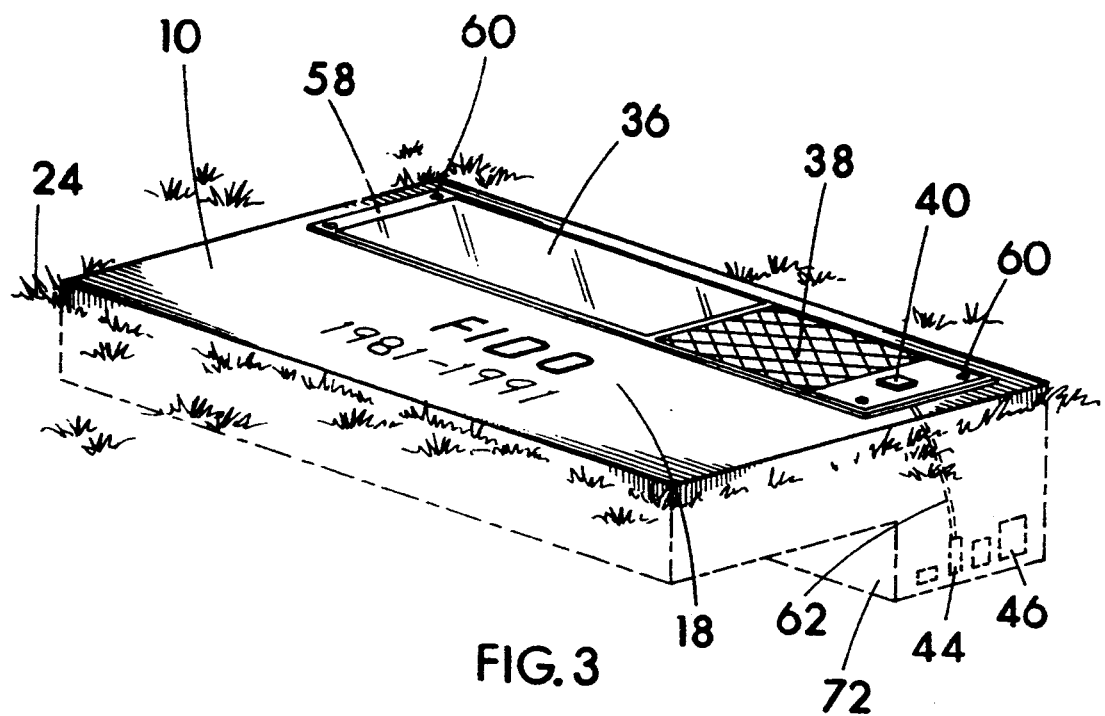
FIG. 3 is a flat or plate style marker with attached audio system also in accordance with the present invention.
Figure 4:
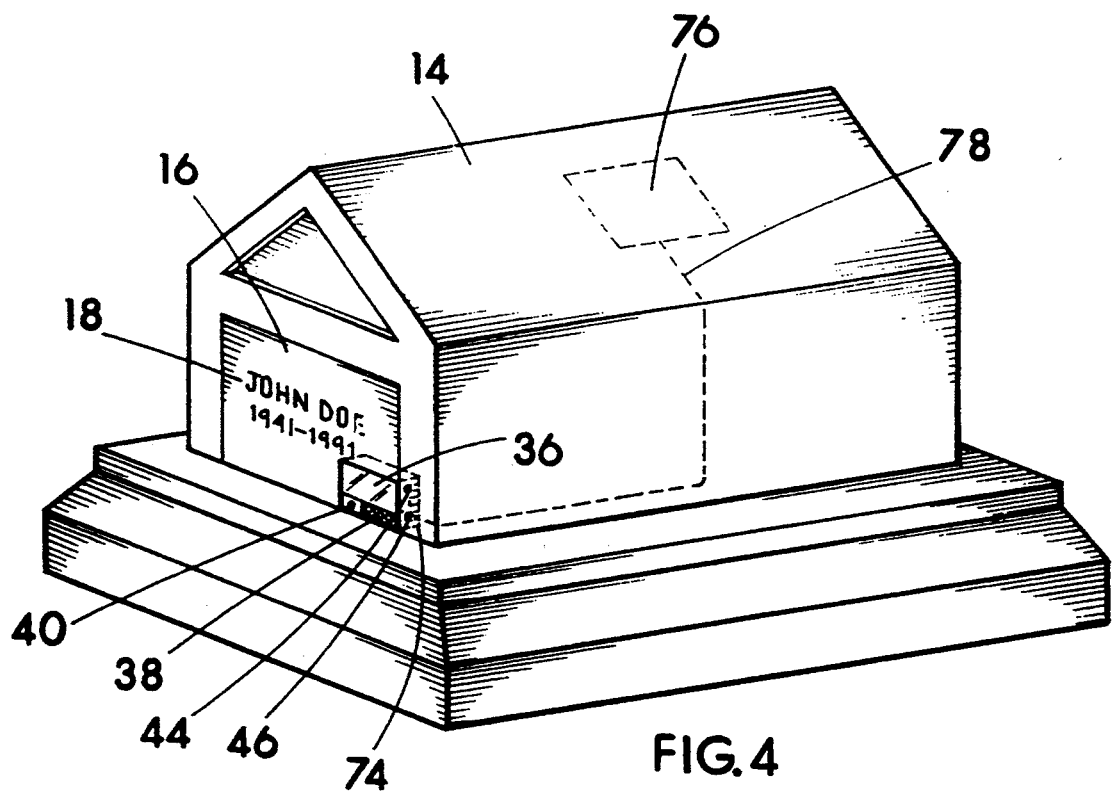
FIG. 4 depicts a mausoleum with the door thereof serving as a marker with attached audio system also in accordance with the present invention.

Referring now to FIG. 3 wherein the flat or plate type resting site marker 10 is shown. Marker 10 also includes a face plate 58 retaining the solar panel 36, the water proof speaker 38, and the start switch 40. Electrical conductors 62 attached to the backside of the solar panel 36, speaker 38 and start switch 40 extend from the backside of the assembly to the digital electronics and memory 44 and battery 46 shown in an enlarged hollow portion 72 of the marker 10 which provides sufficient space for the electrical components 44, and also positions them further downward within the ground for improved temperature control. Start switch 40 could be a galvanic switch which requires the touch of human skin to initiate, or a push button switch connected to a pulse counter and timer circuit which would be set to require two or three presses within a short time period to actuate the audible broadcast, and this being to prevent tractor wheels or the like from unintentionally initiating the broadcast.

Referring now to FIG. 4 showing a mausoleum 14 wherein the door 16 thereof also serves as the marker, and the audio system is attached to the door 16. The door 16 includes the location 18 for applying written material to identify the deceased. The audio system in this example includes a box 74 containing the battery 46 and the digital electronics and memory circuits 44 and support circuitry such as the amplifier attached to the backside of the face plate 58. The door 16 is cut or notched to allow insertion of the box 74 wherein the face plate 58 rests generally flush with the front face of the door 16. The audio system is attached to the door 16 with mechanical fasteners such as screws through face plate 58 to allow removal thereof without having to remove the door 16. An alternative location for a solar panel 36 is shown on the roof of the mausoleum 14 in dotted lines at 76. Electrical conductors between the solar panel on the roof and the audio system box 74 are also shown in dotted lines at 78. The audio system may be entirely surface mounted on the door 16 or any other suitable location on the mausoleum 14 if desired.

Figure 5:
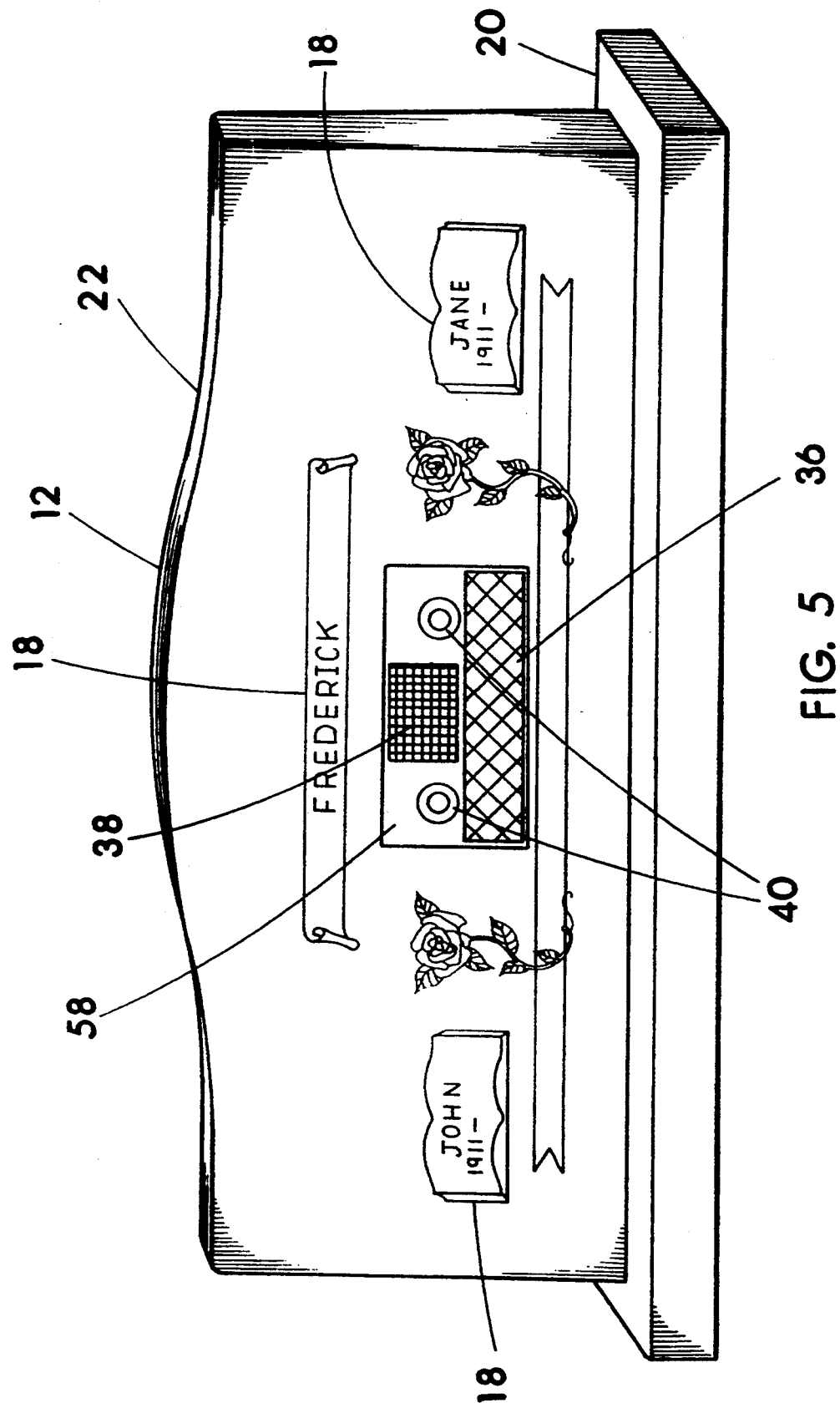
FIG. 5 is a tombstone type marker showing an audio system having two distinct message sets to demonstrate the invention in the relatively common situation where a single marker is used over the remains of two people such as a husband and wife.

Referring now to FIG. 5 where a tombstone 12 is shown with an audio system having two distinct message sets within the digital electronics and memory circuits 44 to demonstrate the invention in the relatively common situation where a single marker is used over the remains of two people such as a husband and wife. Two actuation or start switches 40 are attached in the face plate 58 wherein pressing the switch 40 on the left initiates broadcasts pertaining to the person on the left, and pressing the switch 40 on the right initiates broadcasts pertaining to the person on the right. Although not shown in this drawing, a housing containing the battery 46 and the digital electronics and memory circuits 44 of the audio system is directly behind the face plate 58 within a recess formed in the stone of the tombstone. A solar panel 36 and a water proof speaker 38 are attached to face plate 58.

Figure 6:
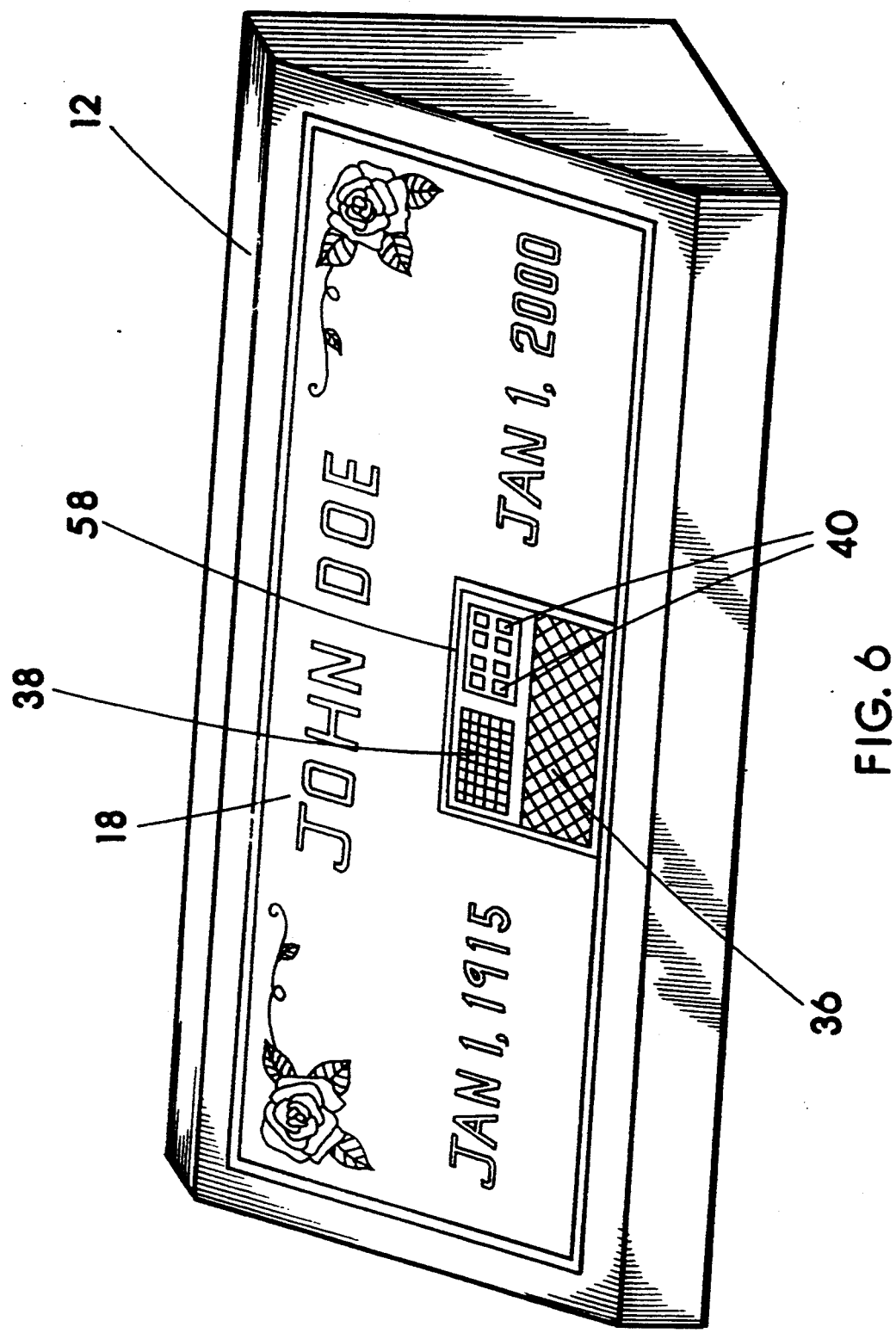
FIG. 6 is a tombstone type marker showing an audio system allowing for the manual selection of various available messages or songs as desired.

FIG. 6 is a tombstone 12 for a single person showing an audio system quite similar to that of the one in FIG. 5, however this audio system includes multiple (8 shown) start switches 40. Each of the start switches 40 is connected to the digital electronics and memory 44 so that the press of one switch or the other, or a combination of presses of switches brings different messages to be audibly broadcast. For example, pressing one switch 40 might cause the audible broadcast of the deceased's favorite song, while the press of another switch 40 might cause the audible broadcast of the deceased's favorite poem, while another switch may bring a recorded voice message from the deceased himself.

Figure 7:
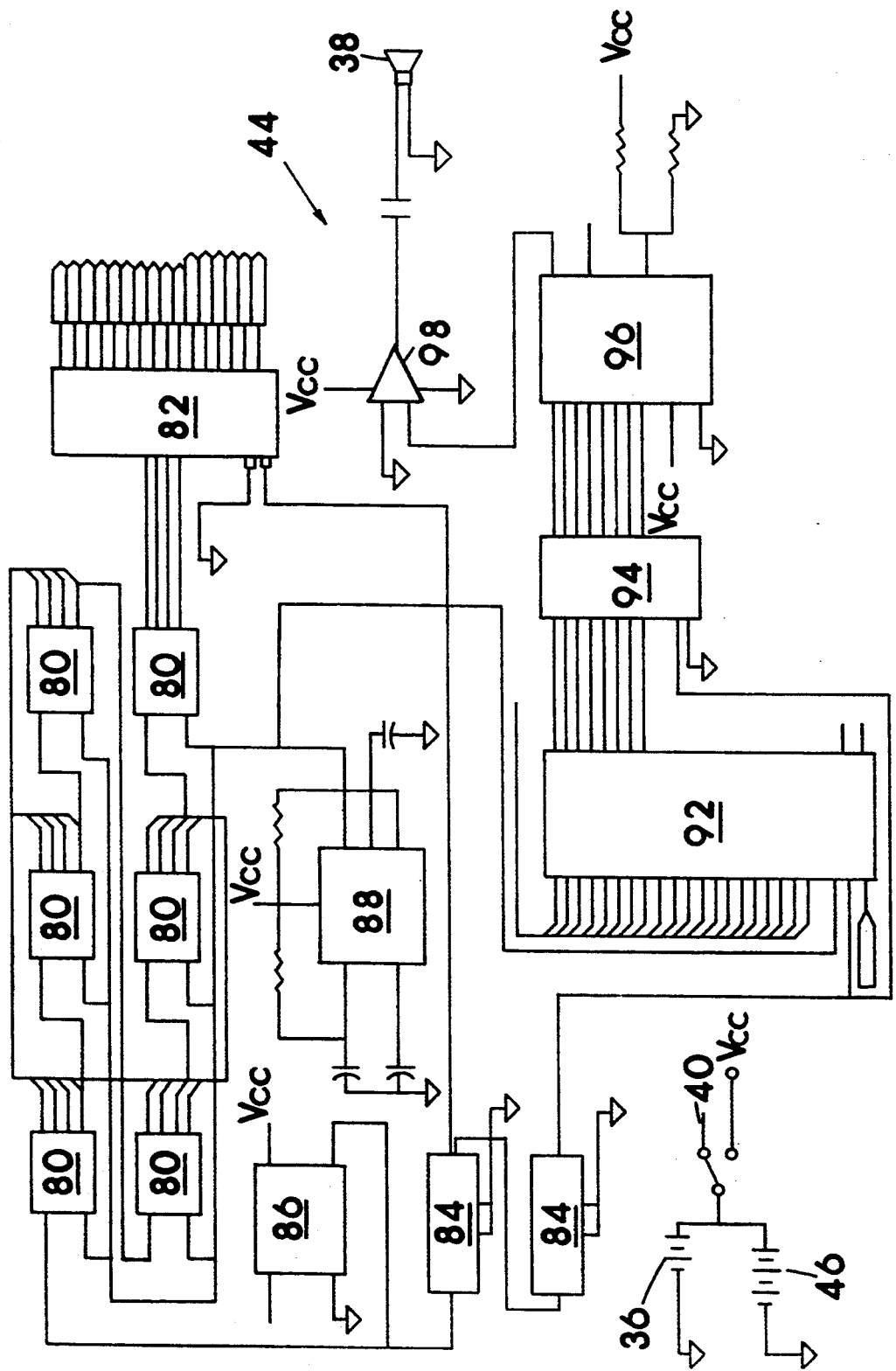
FIG. 7 is a block diagram or schematic for audio reproduction of a previously stored message stored as digital information within a semi-conductor which could be used with the present invention.

FIG. 7 is a block diagram or schematic for audio reproduction of a previously digitally stored message, stored in a flash RAM memory chip 92, which could be used with the present invention. In accordance with the FIG. 7 diagram, upon closing of switch 40, power is sent from battery 46 and/or solar panel 36 to timer 88 which is activated and holds voltage low for a brief period, such as ½ second, then flips to its higher voltage output mode, and this being to counteract the effects of transient voltage spikes caused by initial powering up of the system. At this time, ripple counters 80, six used in this example, begin counting up in binary, the rate being determined by clock 86, to output the digital address into encoder 82 and to output the digital address into flash memory RAM chip 92. Encoder 82, upon receiving an address from counters 80 and upon sufficient passage of time determined by a digital delay 84, activates flash memory RAM chip 92. Flash memory RAM chip 92, depending upon address received from counters 80 and upon sufficient passage of time determined by another digital delay 84, outputs the proper sample to latch 94 which holds the value of the sample for the digital to analog converter 96. Digital to analog converter 96 converts the digital sample to an analog voltage which is amplified by amplifier 98 for output and driving of audio speaker 38.

The descriptions of the present invention have been given for example only, and a number of variables have been discussed. It is believed those skilled in the art will be easily able to make and use the present invention, and will also recognize that changes may be made from the specifics given without departing from the true scope of the invention as recited in my appended claims.

What I claim as my invention is:

1. A combination of a marker for visually identifying the resting place of the remains of a once living entity, with said marker having a location for written information to be applied thereto for specifically identifying the remains, said marker further including an attached audio system having means for audibly broadcasting information relevant to the identified remains; said marker further including an electrical power source in communication with said audio system for providing electrical power to drive said audio system, said audio system including solid-state electronic means for generating said information for audible broadcast;

said electronic means in communication with manually operable switch means for initiating the audible broadcast; said electronic means further including binary counter means for outputting a digital signal at least in part determined by clock means for pulse rate input in communication with said counter means, said electronic means further including encoder means in communication with said counter means for receiving the digital signal from said counting means and for encoding of the digital signal, said counter means and said encoder means in communication with solid-state nonvolatile digital memory means for digitally reproducing previously stored information relevant to the identified remains; digital to analog converting means in communication with said solid-state nonvolatile digital memory means for converting the digitally reproduced previously stored information to analog voltage; said electronic means further including amplification means in communication with said digital to analog converting means for amplifying the analog voltage for driving speaker means in communication with said amplification means for audibly broadcasting information relevant to the identified remains.

* * * * *